United States Patent [19]

Sirven

[11] 4,407,396
[45] Oct. 4, 1983

[54] HYDRAULIC SHOCK ABSORBER HAVING PISTON-MOUNTED VALVE BIASED BY GASEOUS PRESSURE

[76] Inventor: Jacques M. M. Sirven, 34 Rue de l'Orangerie, 78000 Versailles, France

[21] Appl. No.: 281,140

[22] Filed: Jul. 7, 1981

Related U.S. Application Data

[63] Continuation of Ser. No. 3,688, Jan. 15, 1979, abandoned.

[30] Foreign Application Priority Data

Jan. 25, 1978 [FR] France ............... 78 02054

[51] Int. Cl.³ ............................... F16F 9/50
[52] U.S. Cl. ..................... 188/282; 188/322.11; 188/315
[58] Field of Search ............... 188/269, 275, 279, 280, 188/281, 282, 283, 314, 315, 317, 321.11, 322.13, 322.16, 322.17, 315, 322.11

[56] References Cited

U.S. PATENT DOCUMENTS

| | | | |
|---|---|---|---|
| 846,943 | 3/1907 | Phipps | 188/282 |
| 1,164,371 | 12/1915 | Lovejoy | 188/282 OR |
| 1,715,174 | 5/1929 | Shaw et al. | 188/317 X |
| 1,950,685 | 3/1934 | McGee | 188/282 OR |
| 2,742,112 | 4/1956 | Wessel | 188/315 X |
| 2,844,226 | 7/1958 | Long et al. | 188/315 OR |
| 2,869,685 | 1/1959 | Funkhouser et al. | 188/275 OR |
| 3,966,030 | 6/1976 | Sirven | 188/318 OR |
| 4,054,277 | 10/1977 | Sirven | 188/321 X |
| 4,084,667 | 4/1978 | Kurrat | 188/280 X |
| 4,106,596 | 8/1978 | Hausmann | 188/269 X |

FOREIGN PATENT DOCUMENTS 1147806 4/1963 Fed. Rep. of Germany .

*Primary Examiner*—Douglas C. Butler
*Assistant Examiner*—Robert Oberleitner
*Attorney, Agent, or Firm*—Beveridge, DeGrandi and Kline

[57] ABSTRACT

A shock absorber has a cylinder, a piston dividing the cylinder into two chambers, and a valve in the piston which opens to permit hydraulic fluid to flow through the piston when the compression rate of the shock absorber exceeds a limit value. The valve is moved to its open position by the pressure of hydraulic fluid in the chamber in the path of piston movement, and it is biased toward its closed position by a spring on the piston, a constant pressure gas in a reference chamber on the piston and the pressure of hydraulic fluid in the chamber behind the path of piston movement. Fluid from the contracting chamber is released by a check valve into a storage space.

28 Claims, 11 Drawing Figures

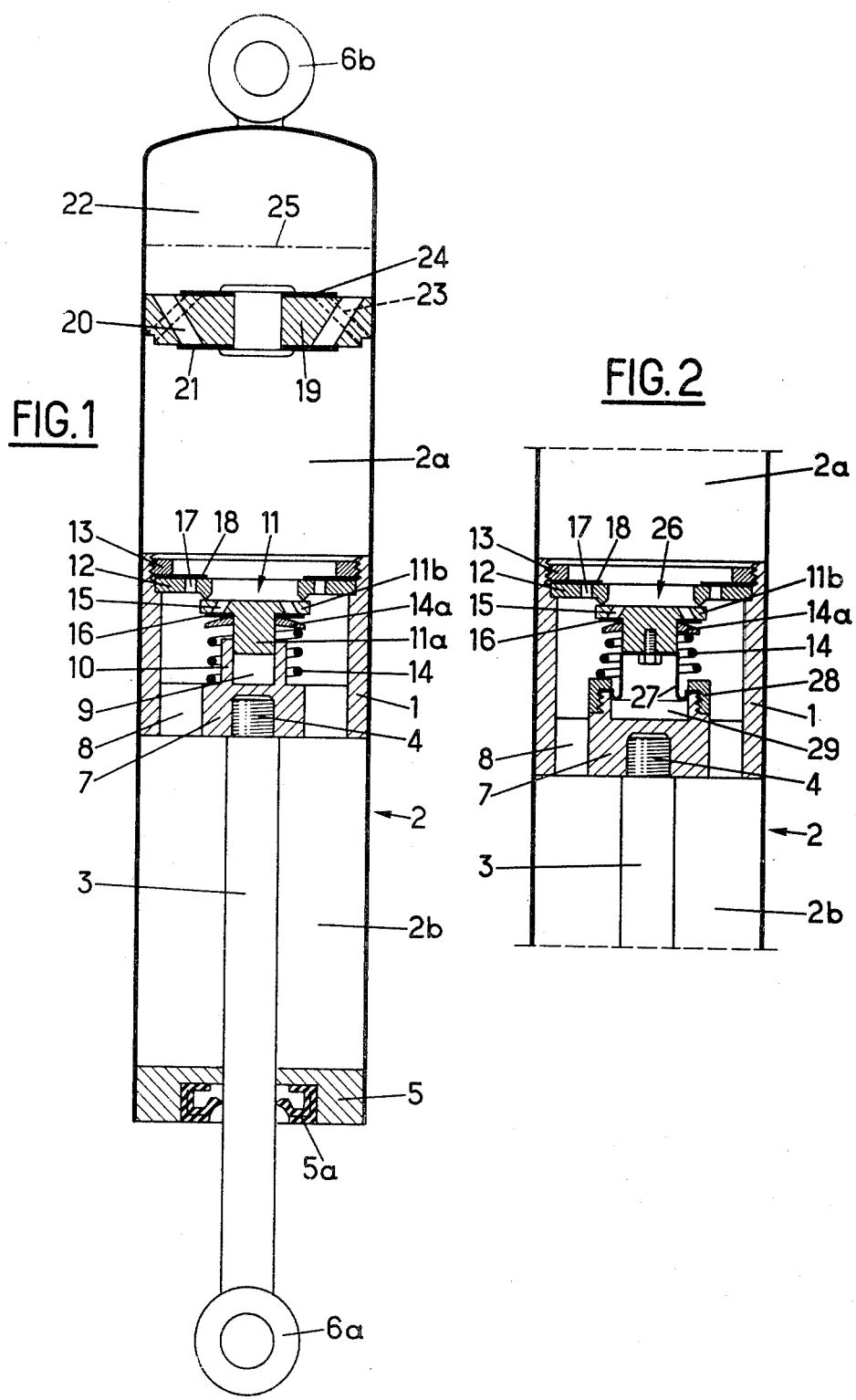

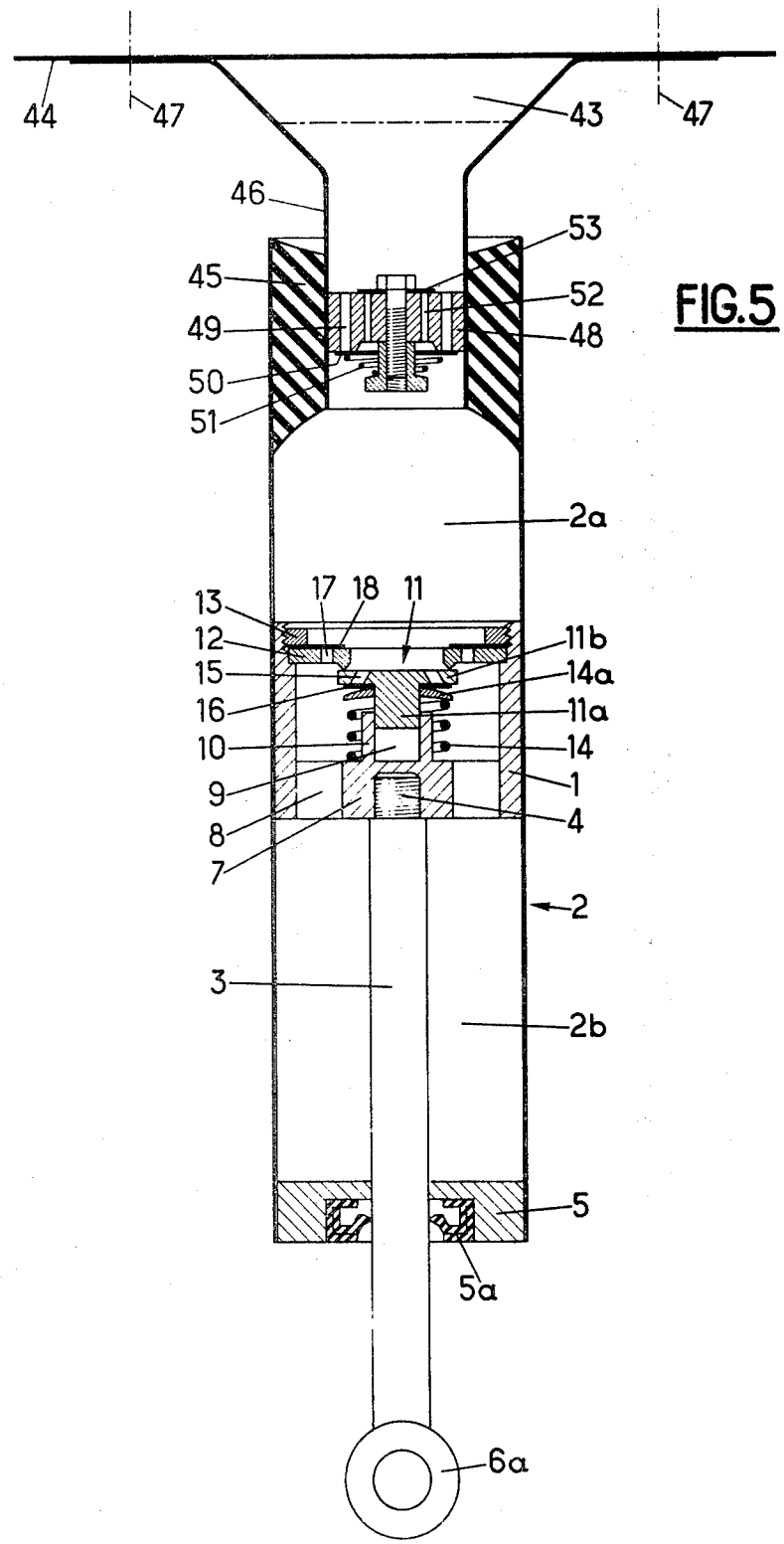

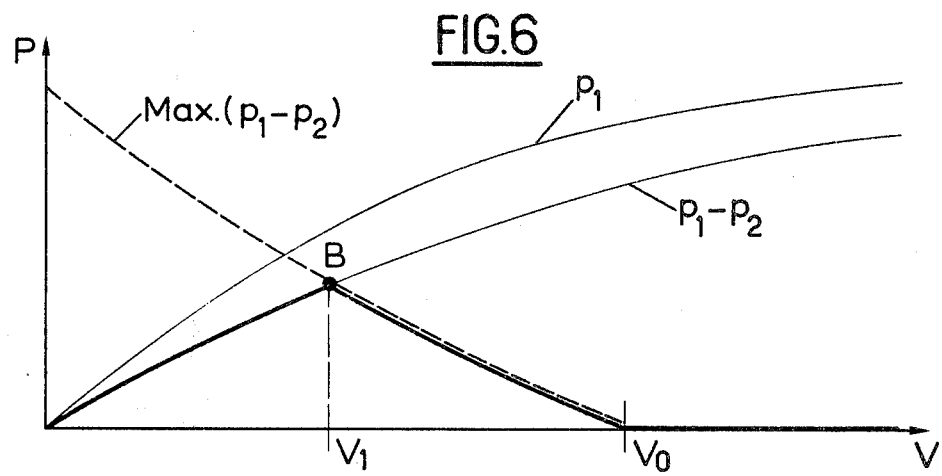
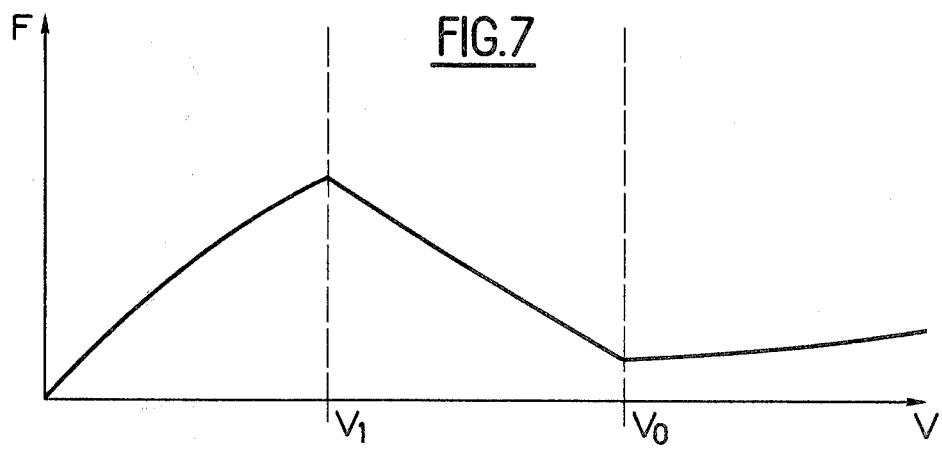
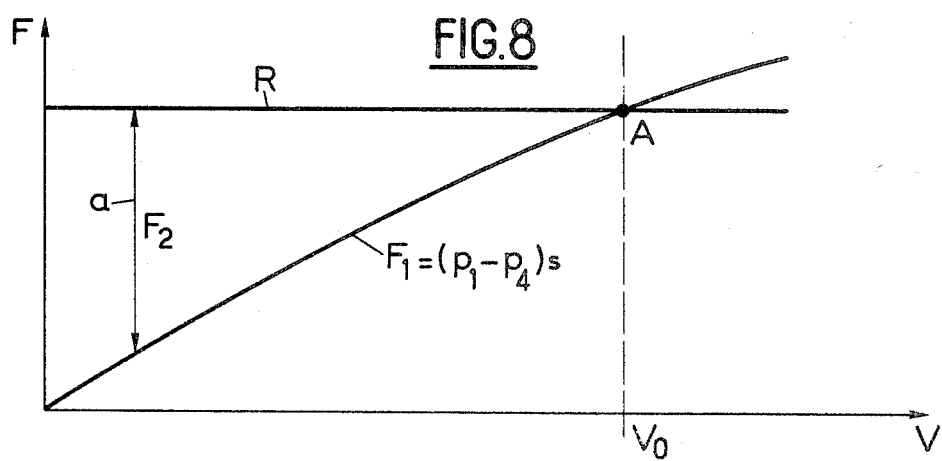

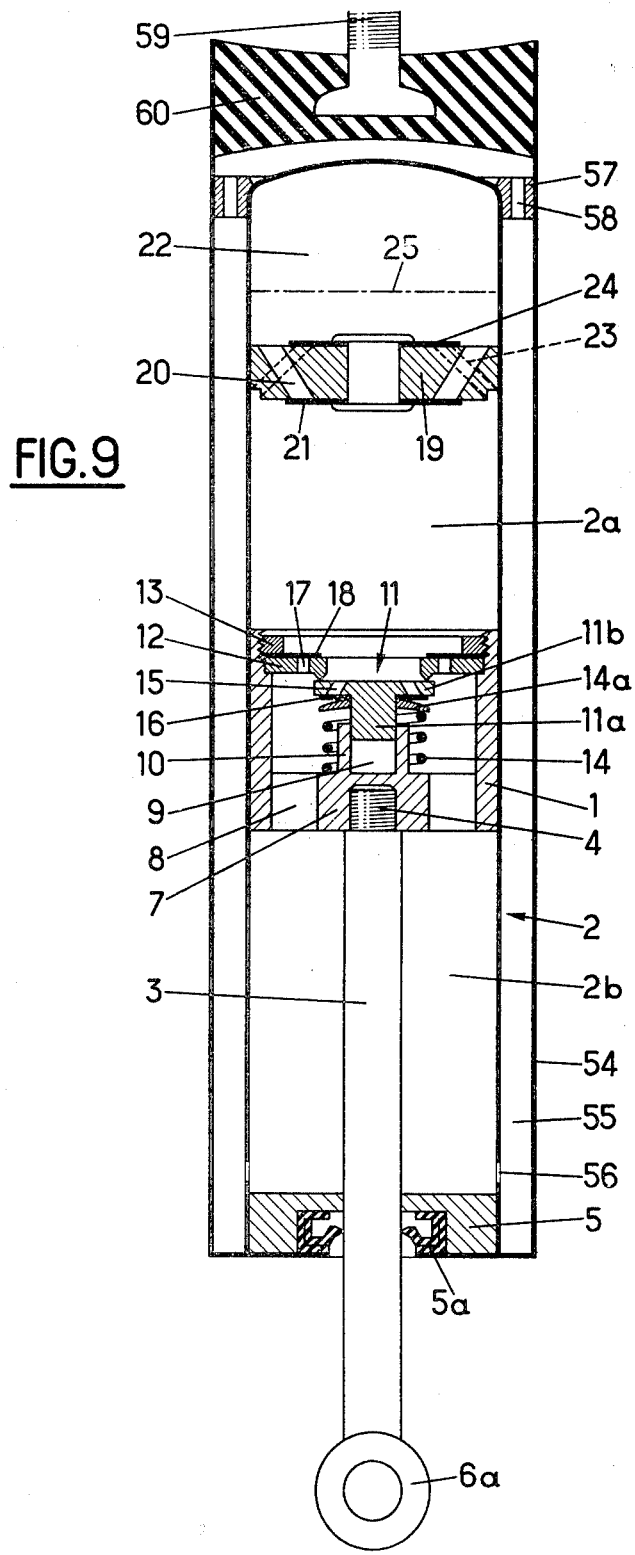

HYDRAULIC SHOCK ABSORBER HAVING PISTON-MOUNTED VALVE BIASED BY GASEOUS PRESSURE

This application is a continuation of application Ser. No. 3,688, filed Jan. 15, 1979, now abandoned.

BACKGROUND OF THE INVENTION

This invention relates to a damping device such as a shock absorber placed between a suspended part and an unsuspended part. For example, the suspended part may be the chassis or body of a vehicle and the unsuspended part may be the vehicle wheels.

Selection of the value of the damping force in a hydraulic shock absorber requires a difficult compromise. During a compression movement of the shock absorber, damping force must be limited so that a sudden impact which occurs when the wheel strikes a small obstacle does not cause too great an acceleration of the mass of the suspended part.

It has been proposed in U.S. Pat. No. 3,966,030 to construct a damping device to maximize damping of the oscillations of the suspended mass during compression movement until the rate of the compression movement exceeds a predetermined maximum value, as when the vehicle wheel hits a slight obstacle which causes a sudden impact on the shock absorber, at which time the damping force decreases.

The hydraulic shock absorber described in this U.S. Pat. No. 3,966,030 includes a regulating valve carried by the cylinder and operated by hydraulic fluid pressure. When it is open, the valve connects the two chambers that are on opposite sides of the main piston in the shock absorber cylinder. The operating pressure of the regulating valve is produced by the penetration of the piston rod into one of the chambers of the shock absorber cylinder, the excess fluid resulting from the reduction of the cylinder volume being retarded while flowing to a hydraulic storge space.

When the velocity of the piston rod exceeds a maximum value during a rapid compression movement, the differential pressure acting on the two faces of the regulating valve increases beyond a predetermined value and opens the regulating valve to produce a rapid reduction of the damping force. Since the hydraulic pressure exerted on the regulating valve is a function of the rate of movement of the piston during compression, the damping force decreases as a function of the axial velocity of the shock absorber piston.

U.S. Pat. No. 3,966,030 also discloses that the shock absorber may have an elastic member which is connected to the vehicle. When the acceleration of the rod is very great, the elastic member is first compressed to increase the volume of the parts immersed in the cylinder. This regulates the regulating valve in the manner described above before the damping force reaches its maximum value.

A particularly advantageous embodiment of a damping device using the teachings of the U.S. Pat. No. 3,966,030 and its French equivalent Patent No. 71 00 893 was also the subject of U.S. Pat. No. 4,054,277 and its equivalent French Pat. No. 74 34 286. In this embodiment, the regulating valve which is always mounted stationarily in the cylinder and whose opening causes a rapid reduction of the damping force, is subjected to the action of a substantially constant reference pressure. One of the faces of the regulating valve provides a surface which forms a wall of a gas-filled reference chamber. This reference chamber can be closed and isolated or opened to the atmosphere, the reference pressure remaining exactly constant. Alternatively, the reference chamber may be connected to the gas-filled part of the hydraulic fluid storage space to provide a pressure balance which is independent of operational variations due to thermal expansion. In all cases, the regulating valve is operated in response to the increase of the pressure of the hydraulic fluid in an intermediate space located between the first chamber of the shock absorber cylinder and the second chamber which receives the piston rod.

SUMMARY OF THE INVENTION

This invention provides an improvement in the hydraulic fluid damping devices of the type mentioned above in which the damping force is reduced when the compression rate of the rod reaches a predetermined limit. According to the present invention, the regulating valve is no longer mounted in a stationary manner in the cylinder but rather is on the piston, the operation of the regulating valve being performed directly by the pressure in the first chamber of the shock absorber cylinder. An intermediate space is unnecessary, so it is possible to simplify the structure of the shock absorber. It can be made of a single tube which has the hydraulic fluid storage space placed at one end thereof.

The damping device according to the present invention comprises a cylinder containing an hydraulic fluid, a piston movable axially in the cylinder and dividing the cylinder into a first chamber and a second chamber, and a rod connected to the piston and extending through the second chamber. The device further comprises a regulating valve exposed to and subjected to the action of the pressure of the fluid in the first chamber whic tends to open the valve. The regulating valve is also subjected to the action of a return spring and the action of a reference gas whose pressure is substantially constant, which tend to close the valve. The regulating valve is operated in response to an increase of pressure in the first chamber during a rapid compression movement in which the rate of compression exceeds a predetermined limit. The device further comprises a fluid storage space communicating with the first chamber by a restriction provided by a one way check or non-return valve. According to the invention, the regulating valve is mounted directly in the piston and is opened and closed by the direct action of the pressure of the hydraulic fluid in the second chamber. The setting of the check valve may establish the pressure at which the regulating valve opens during rapid compression movement of the rod.

The piston preferably further comprises a passage which permits a limited flow of hydraulic fluid from the first chamber to the second chamber during slow compression movement of the rod.

The regulating valve advantageously has a first surface in direct contact with the hydraulic fluid in the first chamber of the cylinder and an opposite second surface having a portion in contact with the reference gas. The remainder of the second surface is in direct contact with the hydraulic fluid in the second chamber of the cylinder.

With this structure, the regulating valve is subjected to the force of the return spring tending to close it and to two forces tending to open it. The latter forces are a force resulting from the differential pressure between the first and second chamber and a force resulting from the differential pressure between the first chamber and the reference gas. The balance of these three forces is such that the regulating valve stays closed as long as the difference of pressure between the first and second chambers of the cylinder does not exceed a maximum limit which is a function of the compression rate of the piston rod. As soon as this maximum value is exceeded, the regulating valve opens causing a reduction of the damping force.

In an advantageous embodiment the reference chamber containing the reference gas can be placed in communication either with the outside atmosphere or with the storage space. In this embodiment, it is preferred to provide communication with the reference chamber by an axial bore in the piston rod.

The particular structure of the valve regulating means of the invention makes it possible to provide an hydraulic fluid storage space in the upper end of a tube which includes the cylinder, opposite from the piston rod. It is also possible to provide an annular hydraulic fluid storage space between the cylinder and an outside jacket concentric with the cylinder.

In an advantageous embodiment, the shock absorber device of the invention has an elastic block, typically an elastomer, placed in the cylinder to cause the pressure to vary in the first chamber during a rapid compression movement.

It must be noted that when the regulating valve opens, the volume of the reference chamber decreases slightly. When said chamber is closed i.e. not in communication with the outside atmosphere the pressure of the reference gas increases therefore slightly. What is meant in the present specification by "substantially constant pressure reference gas" is therefore a reference pressure which is constant when the regulating valve is in a substantially closed position.

BRIEF DESCRIPTION OF THE DRAWINGS

The present invention will be better understood by studying some particular embodiments described by way of example, in no way limiting, and illustrated by the accompanying drawings in which:

FIG. 1 represents a schematic sectional of a first embodiment of a shock absorber according to the present invention;

FIG. 2 is a partial view in section showing the piston in a second embodiment of a shock absorber device similar to that represented in FIG. 1;

FIG. 5 represents a sectional view of another embodiment in which an elastic unit is placed between the hydraulic fluid storage space and the shock absorber cylinder;

FIGS. 6, 7 and 8 show the operation of the shock absorber as a function of the compression rate;

FIG. 9 is a sectional view of a modification of the embodiment of FIG. 1;

DESCRIPTION OF A PREFERRED EMBODIMENT

Figure 3:
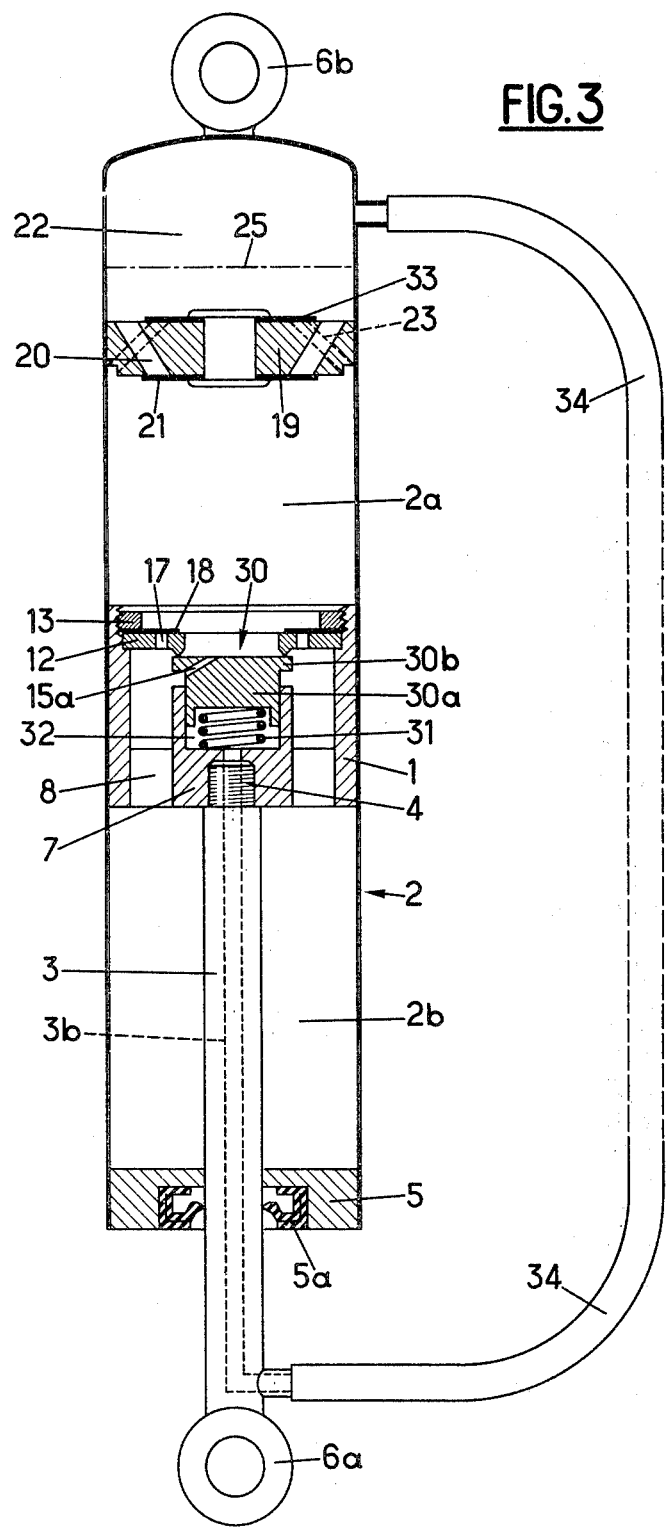
FIG. 3 is a view in section of another embodiment of the present invention making it possible to eliminate the effects of cavitation by increasing the operating pressure of the hydraulic fluid.

FIG. 1 shows an embodiment of a shock absorber device according to the present invention that can be used in an automobile suspension system. The shock absorber includes a piston 1 that slides inside a cylinder 2 and defines in the latter a first chamber 2a on one side of piston 1 and a second chamber 2b which contains rod 3 which is rigidly affixed by its threaded end 4 to the piston 1. Cylinder 2 is affixed at its lower end to a seal 5 which has a central bore provided with a fluid-tight ring 5a through which piston rod 3 passes. At its external end, the piston rod has a hooking ring 6a which can be connected to the automobile wheel. At the opposite end, cylinder 2 is closed and has a pivot eye 6b which can be connected to the vehicle body.

Piston 1 is a hollow part with a central core 7 bored and threaded to receive the end 4 of the piston rod 3. Ribs 8 rigidly and integrally connect the core 7 to the side walls of piston 1, permitting free passage of the hydraulic fluid between them.

Central core 7 further has a reference chamber 9 with an annular wall 10. Reference chamber 9 is filled with a gas and has its upper wall defined by the relatively movable lower surface of regulating valve 11. An auxiliary piston 11a on valve 11 can slide in a fluid tight manner in chamber 9. The regulating valve 11 also includes an upper plate 11b which has a face engageable in fluid tight contact with a valve seat on a washer 12 which is fastened to the side walls of piston 1 by a locking ring 13.

Regulating valve 11 is biased in its closing direction toward the seat of washer 12 by a compression spring 14 which has one end bearing against an edge of central core 7 of piston 1 and another end bearing on the annular cup 14a surrounding lower part 11a of regulating valve 11.

Plate 11b of regulating valve 11 has perforations 15 which are inclined relative to the axis of the device. The perforations cooperate with a flexible non-return valve 16 held against the lower surface of plate 11b by cup 14a and spring 14 to permit a limited passage of hydraulic fluid from the first chamber 2a to the second chamber 2b. Bores 17 in washer 12 cooperate with a flexible non-return valve 18 which permits a limited passage of hydraulic fluid from second chamber 2b to first chamber 2a. Valve 18 is retained between the washer 12 and lock ring 13.

In the upper part of cylinder 2, there is an upper partition 19 with bores 20 which are provided with a flexible flapper-type non-return valve 21 so as to permit a limited passage of hydraulic fluid into chamber 2a from an hydraulic fluid storage space 22 above partition 19. Partition 19 also has bores 23 operable with a flexible flapper-type non-return valve 24 which permits a limited passage of the fluid from first chamber 2a to storage space 22. Storage space 22 is partially filled with hydraulic fluid to the fluid level represented at 25, the storage space also containing a gas such as nitrogen or air.

During operation of the shock absorber device according to the invention, the cylinder chamber between elements 5 and 19 is filled with hydraulic fluid while reference chamber 9 is filled with a gas at substantially constant reference pressure. When the pressure of the fluid in the first chamber 2a is $p_1$ and the pressure of the hydraulic fluid in the second chamber 2b is $p_2$, it is possible to determine the forces exerted on regulating valve 11 by considering the fairly constant pressure $p_4$ of the gas in reference chamber 9, the upper surface area S of plate 11b and the surface area s of auxiliary piston 11a which forms a movable wall of the reference chamber 9.

Valve 11 is subjected to the action of the following four different forces:

(a) the force of spring 14 which tends to close valve 11;

(b) pressure $p_1$ in chamber 2a which acts on surface S of plate 11b in a direction that tends to open the regulating valve 11;

(c) pressure $p_4$ which is fairly constant and acts on surface s of auxiliary piston 11a, tending to close the regulating valve 11; and (d) pressure $p_2$ which acts on the remaining lower surface of plate 11b or (S—s), tending to close regulating valve 11.

FIG. 6 shows the pressure in the various chambers of the shock absorber device of the invention as a function of the rate of compression of rod 3, assuming for simplification that pressure $p_3$ of the hydraulic fluid in the storage space is equal to the outside atmospheric pressure. It can be seen on the solid curves in FIG. 6 that pressure $p_1$ in the first chamber has a tendency to increase as a function of the compression rate V. This is true also for the difference between pressure $p_1$ and $p_2$. It will be noted that pressure $p_1$ should always be greater than difference $p_1-p_2$ to prevent the pressure $p_2$ in the second chamber from being less than atmospheric pressure which would cause cavitation phenomena harmful to the operation. This result is achieved by a suitable choice of the rigidity of flapper valve 24 which makes it possible to increase pressure $p_1$. The two solid curves in FIG. 6 therefore give the variation of these different pressures if the regulating valve 11 were to remain closed.

FIG. 8 shows the different forces acting on valve 11 as a function of compression rate. The force attributable to spring 14 is substantially constant and is shown by horizontal line R. As already mentioned, this force tends to close valve 11. An opposing force is created by the differential pressure exerted on portion s of the lower surface of valve 11 or curve $F_1=(p_1-p_4)s$. Since pressure $p_4$ is constant and pressure $p_1$ increases as a function of compression rate V, this force $F_1$ also increases as shown in FIG. 8.

The curve representing force $F_1$ intersects the straight line representing the force of spring R at point A. From this point, valve 11 is necessarily open and the pressures are equal in both chambers so that $p_1=p_2$. This situation occurs at a compression rate of $V_o$.

For compression rates less than $V_o$ valve 11 stays in the closed position as long as the other forces tending to open said valve are less then the difference between the force of the spring and force $F_1$, i.e. as long as the differential pressure between chambers 2a and 2b exerted on the surface portion (S—s) or the force $F_2=(p_1-p_2)(S-s)$ is less than the force that is represented by distance a in FIG. 8 between the two curves $F_1$ and R. For each value of the compression rate it is therefore possible to determine a limit for force $F_2$ corresponding to the opening of valve 11.

FIG. 6 shows the maximum value of the differential pressure $p_1-p_2$ which corresponds to this maximum value of force $F_2$. This curve identified as $Max(p_1-p_2)$ is shown by broken lines in FIG. 6. It can be seen that it decreases from a value that corresponds to zero compression rate where it can balance exactly the force of spring R to a zero value corresponding to compression rate $V_o$.

From FIG. 6, it can be seen that the structure of the shock absorber device of the invention is such that the pressure difference $p_1-p_2$ can increase only to a maximum value corresponding to point B of FIG. 6 which is the intersection between the curve representing this differential pressure in the absence of valve 11 and the curve representing the maximum value of this differential pressure $Max(p_1-p_2)$ imposed by the existence of said valve and corresponding to its opening. From this point corresponding to a compression rate $V_1$, said differential pressure therefore follows the curve $Max(p_1-p_2)$ to remain zero from compression rate $V_o$.

FIG. 7 represents the variations in the damping force F as a function of the compression rate. While differential pressure $p_1-p_2$ increases to point B of FIG. 6, damping force F also increases as in a standard shock absorber. From the maximum at compression rate $V_1$, the damping force decreases similarly to the decrease of the curve of the maximum differential pressures $Max(p_1-p_2)$ up to compression rate $V_o$. The damping force then remains slight and increases slightly since it is then proportional to the differential pressure $(p_1-p_4)$ between the first chamber and reference chamber 9 exerted on the area of the section of the rod.

When the compression rate of the rod is less than $V_1$, the hydraulic fluid in the first chamber 2a passes into the second chamber 2b by going through passages 15 and the restriction defined by non-return valve 16. The additional volume corresponding to the immersion of rod 3 in cylinder 2 escapes through bores 23 and the restriction of the non-return valve 24. It should be noted that the rigidity of valve 24 has an important influence on the characteristics of the shock absorber of the present invention. This rigidity avoids cavitation phenomena as mentioned above, and it determines the operating pressure of valve 11 and the pressure of the first chamber 2a.

When the compression rate increases to exceed $V_1$, the valve 11 opens, allowing passage of the hydraulic fluid between the upper surface of plate 11b and the seat of washer 12, from the first chamber 2a to the second chamber 2b.

During reverse movement corresponding to expansion of the device, the hydraulic fluid passes through bores 17 and the restrictions defined by non-return valve 18 from second chamber 2b into first chamber 2a. At the same time, hydraulic fluid in storage space 22 goes through passages 20 by means of the non-return valve 21 which is relatively flexible to obtain the best characteristics during expansion operation.

FIG. 2 shows a possible variant of the regulating valve. In this embodiment where the identical parts have the same reference numerals, a flexible membrane 27 is connected to the lower part of the regulating valve 26. The membrane 27 is held and sealed between the upper part of core 7 of piston 1 and a threaded annular cap nut 28. Reference chamber 29 is expansible by virtue of its mobile wall, i.e. the membrane 27 affixed to valve 26. The operation of the device is identical to that of FIG. 1.

FIG. 3 shows a slightly different embodiment modified to eliminate the harmful cavitation phenomenon. In this embodiment the identical parts have the same reference numerals as used above.

It is known that to avoid cavitation in a shock absorber it is advisable to increase the pressure of the hydraulic fluid. This is achieved in the shock absorber unit shown in FIG. 3 wherein a regulating valve 30, provided with a restriction 15a, has a lower cylindrical portion 30a with a much larger diameter relative to the upper plate 30b than in the embodiment of FIG. 1. A return spring 31 is located in a reference chamber 32. The chamber 32 is larger than reference chamber 9 of FIG. 1 but it performs the same role. Due to this modification, the lower surface of valve 30 is relatively larger than the lower surface s of the valve 11 in FIG. 1.

Since any harmful cavitation effect is eliminated by increasing the pressure of the hydraulic fluid in the embodiment of FIG. 3, the non-return valve 33 associated with passages 23 of upper closing part 19, no longer has an anti-cavitation role as in FIG. 1. Thus, valve 33 may be more flexible, its sole role being to permit operation of valve 30. This increased flexibility of valve 33 makes it possible to obtain a slighter damping force when regulating valve 30 is completely open. This force was shown in FIG. 7 for a compression rate greater than the maximum rate $V_o$. The differential pressure $(p_1-p_4)$ between the first chamber and the reference chamber are less in the embodiment of FIG. 3, so a slighter damping force is effectively obtained. To obtain an adequate force on lower part 30a of regulating valve 30, its lower surface s must be increased as mentioned and shown.

The embodiment of FIG. 3 includes another feature which may be applied to the embodiment of FIG. 1. The reference chamber 32 is connected in communication with the upper part of the fluid storage space 22. This communication is obtained by flexible piping 34 and an axial bore 3b which extends along the full length of rod 3 and connects to the reference chamber 32. This avoids pressure fluctuations due to temperature variations in the shock absorber device. With this arrangement, the reference chamber 32 can contain a part of the fluid in storage space 22, so long as no restriction impedes the free passage of this fluid toward the storage space. In this case, piping 34 may connect to the lower liquid-holding part of storage space 22. It would also be possible to put reference chamber 32 and/or storage space 22 in communication with the atmosphere.

It will be noted that it is preferable to fasten the shock absorber of the invention by eyes 6a and 6b and rigid joints, without using elastic units. Actually, considering the characteristics shown in FIG. 7, the use of elastic units would run the risk of rebound phenomena and undesirable noises.

The damping device as shown in FIGS. 1 to 3 makes it possible to obtain sudden variations of the damping force. In certain applications, it may be necessary to obtain a gradual build-up of a maximum damping force and also a gradual reduction beyond the maximum compression rate. The embodiments shown in FIGS. 4 and 5 make it possible to obtain this result.

Figure 4:
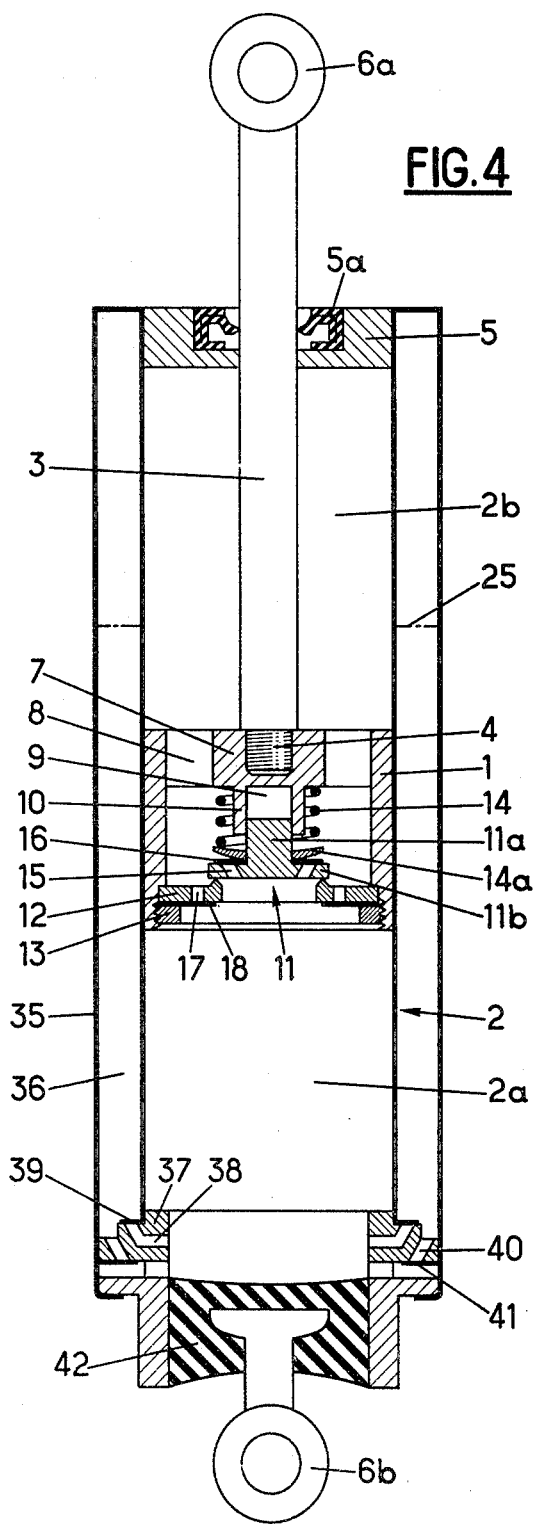
FIG. 4 is a sectional view similar to the above showing another variant of a device according to the invention comprising two concentric tubes which form the hydraulic fluid storage space.

In FIG. 4 identical parts have the same reference numerals as above. In this embodiment it can be seen that the shock absorber is arranged with the rod extending upwardly. It comprises an outside cylindrical casing 35 concentric with the cylinder 2 to provide an annular chamber which serves as an hydraulic fluid storage space 36. A lower partition 37 performs the role of the upper closing part 19 of the preceding embodiments. It has passages 38 and a non-return valve 39 permitting the passage of the hydraulic fluid from first chamber 2a to storage space 36. Passages 40 and a non-return valve 41 allow a limited passage of the hydraulic fluid in the opposite direction.

Fastening of the shock absorber is performed by an elastic unit 42, an elastomer body mounted on the lower part of the shock absorber and forming a deformable, fluid-tight lower wall for first chamber 2a. The fastening could also be done for example by an eye affixed to part 37.

During a sudden compression of the shock absorber, the elastomer elastic unit 42 penetrates partly into the inside of first chamber 2a before any compression movement of the rod occurs, reducing the effective volume of said chamber. This causes an increase in the pressure $p_1$ in chamber 2a, this increased pressure acting on the regulating valve 11 as previously described. The elastic unit 42 therefore prevents the rapid build-up of the damping forces because a rapid increase of this force causes a deformation of the elastic unit 42 and consequent opening of regulating valve 11.

It will be noted that the action of elastic unit 42 should not be compared to that of an elastic link external to the shock absorber such as is found in numerous known embodiments, because the deformation of the elastomer elastic unit 42 here affects both the regulating pressure in the first chamber and the operation of regulating valve 11.

FIG. 5 shows a modification of the FIG. 4 embodiment in which the piston rod extends downwardly and the storage space 43 is located in the upper part of cylinder 2 which is fastened directly to the vehicle body 44. The upper part of cylinder 2 is closed by an elastomer elastic unit 45 which is rigidly affixed to the inside wall of cylinder 2. The inside of unit 45 is fastened to a cylindrical sleeve 46 which diverges upwardly and has a fastening strap which is fastened to the automobile body 44 by a screw at 47. A partition 48 which performs the same function as upper partition 19 is fastened to the inside of sleeve 46. The partition 48 has generally axial passages 49 that can be obstructed by an elastic washer 50 which acts as a non-return valve. Washer 50 is biased upward by a spring 51 to permit hydraulic fluid to flow from storage space 43 to first chamber 2a.

The partition 48 also has substantially axial passages 52 associated with an inflexible vertically movable non-return valve 53 which allows the flow of hydraulic fluid in an opposite direction.

The embodiment of FIG. 5 can easily be applied to a MacPherson type automobile suspension in which the shock absorber is placed concentrically within the main suspension spring. Further, this type of shock absorber can be integrated in hydropneumatic suspensions which use the gas contained in the storage space under pressure as the spring. In this case, this spring force is transmitted by the rod of the shock absorber whose section is appropriately proportioned.

Operation of the embodiment of FIG. 5 is identical to that of FIG. 4. It is, of course, possible to provide either of these embodiments with a communication between the reference chamber and the storage space in a manner similar to that described in connection with FIG. 3.

It will be noted that in all embodiments, but particularly in those where the storage space is under pressure, a movable piston or a flexible membrane may be used to separate the gas and hydraulic fluid in the storage space.

FIG. 9 represents a modified fastening of the device of FIG. 1 to a vehicle body. Identical parts carry the same reference numerals. In this embodiment, an outside jacket 54 is concentric with cylinder 2 and defined with it a third annular chamber 55. This third chamber 55 communicates with second chamber 2b by orifices 56. A spacer and fastener part 57 holds jacket 54 in concentric position in relation to cylinder 2. Part 57 is pierced by orifices 58 which allow a free circulation of the hydraulic fluid in both directions around cylinder 2. The upper end of the shock absorber is connected to the body of the vehicle with a threaded connection 59 which has an enlarged head buried in an elastic unit 60, the perimeter of which is sealed and affixed to the lateral wall of jacket 54 above the upper end of cylinder 2.

In the FIG. 9 embodiment, the shock absorber operates as follows: during a sudden compression, elastic unit 60 is deformed into the third chamber 55, reducing the flow of fluid from the first chamber 2a into the second chamber 2b. Consequently, there is an increase in the flow of fluid from first chamber 2a to storage space 22. The rigidity of valve 24 causes a considerable increase of pressure $p_1$ in first chamber 2a but only a slight increase of pressure $p_2$ in second chamber 2b. Consequently, the regulating valve 11 opens. Elastic unit 60 thus plays a role comparable to that of elastic unit 42 of the embodiment of FIG. 4, preventing the sudden build-up of the damping force.

If the shock absorber represented in FIG. 9 is modified by placing a movable barrier between the gas of storage space 22 and the hydraulic fluid, for example a flexible membrane or a mobile piston, the rod may extend upwardly, eye 6a being fastened to the vehicle body and connection 59 being fastened to the unsuspended mass.

Figure 10:
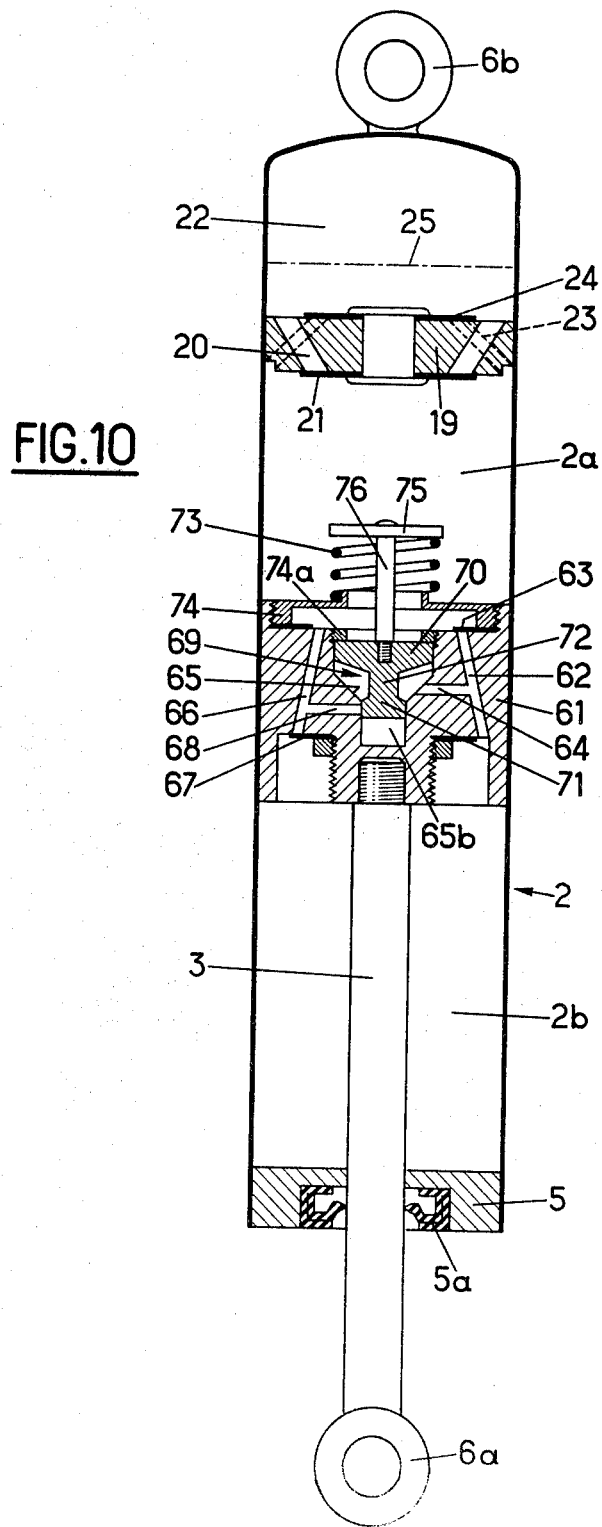
FIG. 10 is a sectional view of another modification of the shock absorber of FIG. 1.

The shock absorber shown in FIG. 10 has a modified regulating valve, in the form of an axially movable slide valve. Of course, such a slide valve may be used in any of the embodiments described above. In FIG. 10 where identical parts carry the same reference numerals, piston 61 has passages 62 which connect second chamber 2b to first chamber 2a by a flapper type non-return valve 63. A branch 64 from passage 62 puts second chamber 2b in communication with a central bore 65 of the piston 61. Piston 61 also has passages such as 66 which provide communication between chambers 2a and 2b by non-return valve 67. A branch 68 extends between passages 66 and bore 65.

A slide valve 69 is axially movable in bore 65. The lower portion 65b of bore 65 is a gas-filled reference chamber similar to chamber 9 of FIG. 1. In FIG. 10, the valve slide 69 includes section 70 that can move in a first cylindrical part of bore 65 and a smaller diameter second section 71 movable in a second cylindrical portion 65b of bore 65.

Valve slide sections 70 and 71 are connected by a smaller diameter midportion 72. Slide 69 is biased upwardly by a return compression spring 73 which is compressed between a ring 74 affixed to piston 61 and a cup 75 affixed by rod 76 to slide 69. The upward movement of slide 69 is limited by a step ring 74a rigidly affixed to piston 61 and threaded within the upper end of bore 65.

During a slow compression movement of rod 3, the hydraulic fluid can pass through passages 66 and non-return valve 67 from the first chamber 2a into the second chamber 2b. Slide valve 69 stays closed as shown in FIG. 10. In this position there is no communication between branches 68 and 64 of the passages 66 and 62, because slide valve section 71 blocks the orifice of branch 68.

During a rapid compression movement which exceeds a certain limit, the pressure increasing in first chamber 2a, moves slide 69 downwardly against the force of spring 73. This downward movement uncovers the orifice of branch 68 to place the latter in communication with bore 65 and branch 64. This enables the hydraulic fluid to pass freely from first chamber 2a into the second chamber 2b by successive passages through 66 and 68, bore 65 and passages 64 and 62.

Figure 11:
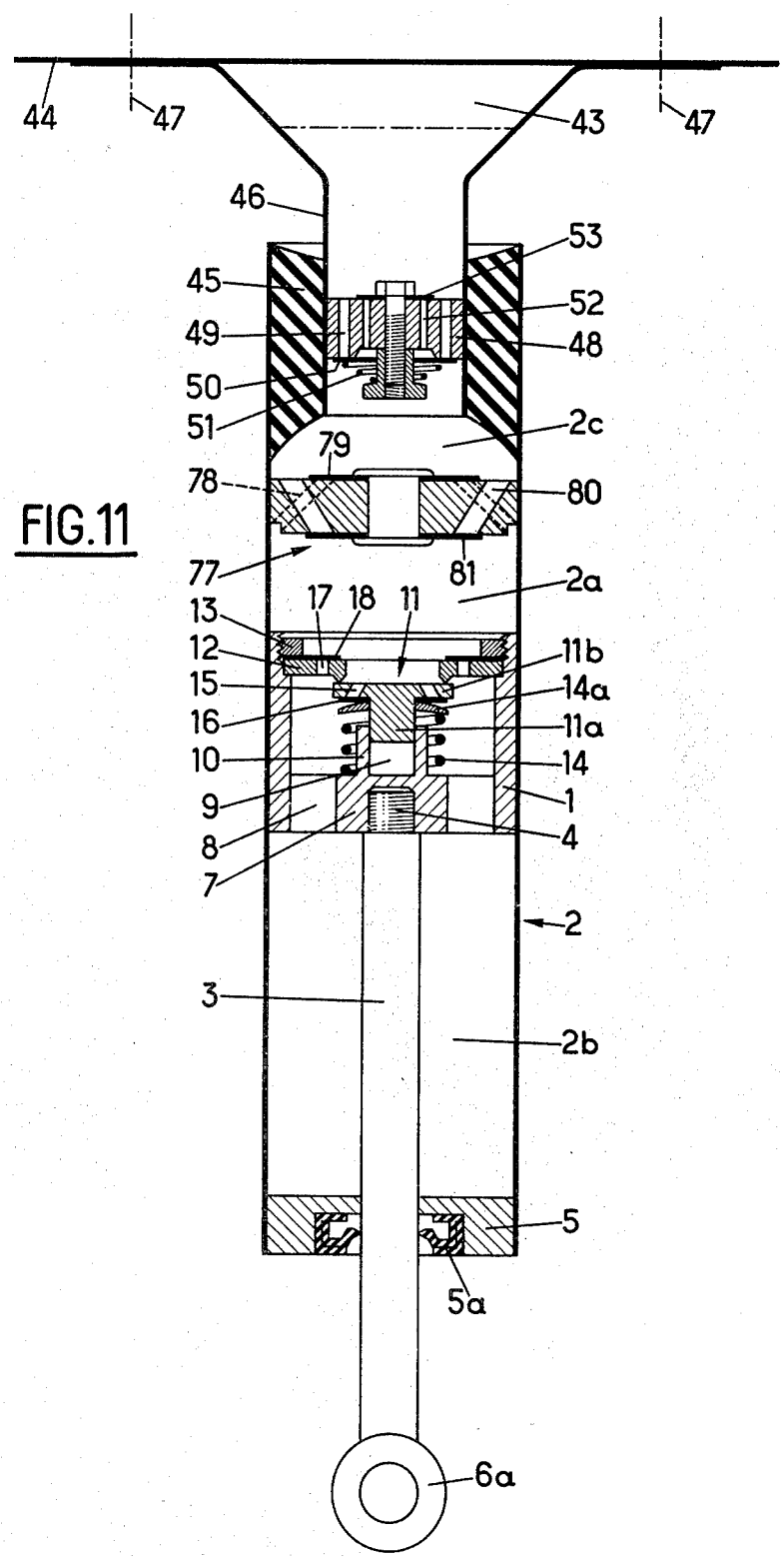
FIG. 11 is a sectional view of a variant of the shock absorber of FIG. 5.

FIG. 11 shows an improvement in the embodiment of FIG. 5, the identical parts having the same reference numerals. The embodiment of FIG. 11 is applicable to certain applications in which rapid compression would cause a very high pressure in first chamber 2a of the embodiment of FIG. 5, this pressure being exerted directly on elastic unit 45 and reacting on the vehicle body.

In FIG. 11, a first partition element 77 is placed between the first chamber 2a and an upper portion 2c of the first chamber 2a. The partition 77 has passages 78 associated with a first flexible flapper type non-return valve 79 which when open permits hydraulic fluid to flow from the first chamber 2a to the upper portion 2c of the chamber. For expansion movements, the partition 77 has passages 80 associated with a flexible flapper type non-return valve 81 which permits movement of the hydraulic fluid in the opposite direction.

The partition element 48 is described in connection with FIG. 5. It has a second valve 53 and is located between the upper portion 2c and the storage space 43.

The overall pressure drop between the chamber 2a and the storage space 43, in the embodiment of FIG. 11, is the sum of the pressure drops created by the non-return valves 79 and 53. Preferably, the rigidity of valves 79 and 53 is selected to obtain a considerable pressure drop between first chamber 2a and the upper portion 2c, and a much slighter pressure drop between the upper portion 2c and the storage space 43. With this arrangement, the elastic unit 45 is subjected to only a slight pressure in portion 2c, causing the separation of the shock absorber to be less rough during a rapid compression movement.

In the embodiments that have been described, the regulating valve has always had a surface S subjected to the direct action of the pressure in first chamber 2a, with an area greater than that of surface s on which the pressure of the reference gas is exerted. This difference in area makes it possible to obtain the negatively-sloped portion of the curve of FIG. 7 to assure good stability in the system. However, it would be possible in certain applications to provide a valve in which the two surfaces in question would be equal in area, in which case the corresponding portion of the curve of FIG. 7 would be a segment of a vertical straight line, the damping force passing suddenly from a large value to a low value for maximum compression rate $V_1$. The stability problems encountered in such an arrangement can be solved at least partially by the action of an elastic unit such as the one used in the embodiments of FIGS. 4, 5 and 9.

The present invention applies to any shock absorber device whatsoever for vehicles or for other bodies undergoing sudden impacts. The shock absorber of the invention makes it possible to control the rate of build-up of the force, has an advantageous application in terminal buffers for railroad cars, brakes of artillery pieces, aircraft landing gear, etc.

Persons skilled in the art will appreciate that the invention may take many forms other than the specific preferred embodiment described herein. Therefore, it is emphasized that the invention is not limited to the illustrated and described embodiments, but is embracing of a variety of other structures which fall within the spirit of the following claims.

I claim:

1. A damping device for damping the relative movement of two bodies comprising:
   a cylinder for hydraulic fluid,
   a main piston movable axially in the cylinder and dividing the cylinder into a first chamber and a second chamber,
   a rigid element secured to said piston,
   a rod connected to the piston and extending through the second chamber,
   a fluid storage space which is in communication with the first chamber and is not in direct communication with the second chamber,
   a first restrictive passage means opening from said first chamber to said storage space permitting fluid to flow from said first chamber to said storage space, said restrictive passage means limiting the flow of fluid therethrough to cause the pressure in the first chamber to increase in response to piston movement toward the first chamber,
   a regulating valve on said main piston, said regulating valve being movable during a rapid compression movement of said piston from a closed position to an open position at which said first chamber is in communication with said second chamber, said regulating valve having surfaces exposed to pressures of the fluid in the first and second chambers,
   a return spring for biasing the regulating valve toward its closed position, said return spring bearing against said rigid element secured to said piston,
   a substantially fluid tight reference chamber on said main piston containing a substantially constant pressure gas for biasing the regulating valve toward its closed position, said regulating valve having a first surface portion which closes said reference chamber, a second surface portion of said valve being exposed to the pressure of said first chamber, and said first surface portion having an area no greater than said second surface portion,
   said regulating valve and said reference chamber acting as pressure control means which, within a range of compression rates which lie below a given compression rate ($V_1$), is operable to provide damping forces which increase progressively when the compression rate increases, and
   said pressure control means, within a range of compression rates which lie above said given compression rate ($V_1$) and below a limit compression rate ($V_0$) being operable to provide damping forces which decrease progressively when the compression rate increases.

2. A damping device as claimed in claim 1 wherein said main piston has a limited passage means for admitting a limited flow of the hydraulic fluid from said first chamber into said second chamber during a slow compression movement of said main piston.

3. A damping device as claimed in claim 2 in which said regulating valve has an auxiliary piston having a surface in contact with said substantially constant pressure gas.

4. A damping device as claimed in claim 1 in which said regulating valve has an auxiliary piston which has a surface in contact with said substantially constant pressure gas.

5. A damping device as claimed in claim 4 in which said piston has a flexible membrane which comprises a wall of said reference chamber.

6. A damping device as claimed in claim 5 wherein said return spring is mounted outside of said reference chamber.

7. A damping device as claimed in claim 6, said device being in combination with and rigidly fastened to said bodies.

8. A damping device as claimed in claim 3 wherein said return spring mounted inside said reference chamber.

9. A damping device as claimed in claim 4 in which said storage space is annularly disposed around said cylinder.

10. A damping device as claimed in claim 9, having an elastic member for fastening said damping device to a first of said bodies, said elastic member forming an end of said first chamber, whereby the pressure of the fluid in said first chamber increases when said elastic member is subjected to a rapidly increasing force to open said regulating valve.

11. A damping device as claimed in claim 4, said main piston having passages therein, said auxiliary piston being movable to open and close said passages.

12. A damping device as claimed in claim 11, said device being in combination with and rigidly fastened to said bodies.

13. A damping device as claimed in claim 4 in which the substantially constant pressure gas is at atmospheric pressure.

14. A damping device as claimed in claim 13 in which said rod has a hollow bore which is in communication with said reference chamber, and means for connecting said bore to said storage space.

15. A damping device as claimed in claim 14 in which said storage space located at one axial end of said cylinder opposite from said rod.

16. A damping device as claimed in claim 14, said device being in combination with and rigidly fastened to said bodies.

17. A damping device as claimed in claim 4 in which said rod has a hollow bore which is in communication with said reference chamber, and means for connecting said bore to said storage space.

18. A damping device as claimed in claim 4 in which said storage space is located at the axial end of said cylinder opposite from said rod.

19. A damping device as claimed in claim 4 in which said storage space is annularly disposed around said cylinder.

20. A damping device as claimed in claim 19, having an elastic member for fastening said damping device to a first of said bodies, said elastic member forming an end of said first chamber, whereby the pressure of the fluid in said first chamber increases when said elastic member is subjected to a rapidly increasing force to open said regulating valve.

21. A damping device as claimed in claim 4, having an elastic member for fastening said damping device to a first of said bodies, said elastic member forming an end of said first chamber, whereby the pressure of the fluid in said first chamber increases when said elastic member is subjected to a rapidly increasing force to open said regulating valve.

22. A damping device as claimed in claim 4, comprising a fourth chamber having an elastic wall means and communicating with said second chamber, means for connecting said elastic wall means to one of said bodies, whereby rapidly increased forces exerted by the body on the wall means increases the pressure in the first chamber to open said regulating valve.

23. A damping device as claimed in claim 4, said device being in combination with and rigidly fastened to said bodies.

24. A device according to claim 1 wherein the regulating valve is constructed and disposed so that the forces acting on the regulating valve are R, $F_1$ and $F_2$ and $F_1 = (P_1-P_4)s;$ $F_2 = (P_1-P_2)(S-s);$ wherein R is the force exerted on the regulating valve by the return spring;

$P_1$ is the fluid pressure in the first chamber;

$P_2$ is the fluid pressure in the second chamber;

$P_4$ is the pressure of the gas in the reference chamber;

s is the effective area of the first surface portion of the regulating valve exposed to the gas in the reference chamber; and S is the effective area of said second surface portion of the regulating valve.

25. A damping device for damping the relative movement of two bodies comprising:

a cylinder for hydraulic fluid, a main piston movable axially in the cylinder and dividing the cylinder into a first chamber and a second chamber and having a rigid element, a rod connected to the piston and extending through the second chamber, a fluid storage space which is in communication with the first chamber and is not in direct communication with the second chamber, a first restrictive passage means opening from said first chamber to said storage space permitting fluid to flow from said first chamber to said storage space, said restrictive passage means limiting the flow of fluid therethrough to cause the pressure in the first chamber to increase in response to piston movement toward the first chamber, a regulating valve on said main piston, said regulating valve having an auxiliary piston and being movable during a rapid compression movement on said main piston from a closed position to an open position at which said first chamber is in communication with said second chamber, said regulating valve having surfaces exposed to pressures of the fluid in the first and second chambers, a return spring for biasing said regulating valve toward its closed position, said return spring bearing against said rigid element of said main piston, a substantially fluid tight reference chamber on said main piston containing a substantially constant pressure gas for biasing the regulating valve toward its closed position, said regulating valve having a first surface portion exposed to and constituting a closing surface for said reference chamber, said regulating valve also having a second surface portion which is exposed to the pressure of said first chamber, said first surface portion having an area no greater than said second surface portion, said return spring being mounted so as to surround at least partially said reference chamber, said regulating valve and said reference chamber acting as pressure control means which, within a range of compression rates which lie below a given compression rate ($V_1$), is operable to provide damping forces which increase progressively when the compression rate increases;

said pressure control means, within a range of compression rates which lie above said given compression rate ($V_1$) and below a limit compression rate ($V_0$), being operable to provide damping forces which decrease progressively when the compression rate increases.

26. A device according to claim 25 wherein the regulating valve is constructed and disposed so that the forces acting on the regulating valve are R, $F_1$ and $F_2$ and $F_1 = (P_1-P_4)s;$ $F_2 = (P_1-P_2)(S-s);$ wherein R is the force exerted on the regulating valve by the return spring;

$P_1$ is the fluid pressure in the first chamber;

$P_2$ is the fluid pressure in the second chamber;

$P_4$ is the pressure of the gas in the reference chamber;

s is the effective area of the first surface portion of the regulating valve exposed to the gas in the reference chamber; and S is the effective area of said second surface portion of the regulating valve.

27. A damping device for damping the relative movement of two bodies comprising:

a cylinder for hydraulic fluid, a main piston movable axially in the cylinder and defining within the cylinder a first chamber and a second chamber and having a rigid element, a rod connected to the piston and extending through the second chamber, a fluid storage space which is in communication with the first chamber and is not in direct communication with the second chamber, a regulating valve on said main piston, said regulating valve being movable during a rapid compression movement of said piston from a closed position to an open position at which said first chamber is in communication with said second chamber, said regulating valve having surfaces exposed to pressures of the fluid in the first and second chambers, a return spring for biasing the regulating valve toward its closed position said return spring bearing against said rigid element of said main piston, a substantially fluid tight reference chamber on said main piston containing a substantially constant pressure gas for biasing the regulating valve toward its closed position, said regulating valve having a first surface portion exposed to and constituting a closing surface for said reference chamber, said regulating valve having a second surface portion exposed to the pressure of said first chamber, said first surface portion having an area no greater than said second surface portion, said regulating valve and said reference chamber acting as pressure control means which, within a range of compression rates which lie below a given compression rate ($V_1$), is operable to provide damping forces which increase progressively when the compression rate increases, said pressure control means, within a range of compression rates which lie above said given compression rate ($V_1$) and below a limit compression rate ($V_0$), being operable to provide damping forces which decrease progressively when the compression rate increases, a third chamber in said cylinder;

an elastic member for fastening said damping device to a first of said bodies, said elastic member forming an end of said third chamber; whereby the pressure of the fluid in said third chamber increases when said elastic member is subjected to a rapidly increasing force;

a fixed partition secured to said cylinder and mounted between said first chamber and said third chamber, said partition having a first restrictive check valve means connected between said first chamber and said third chamber to decrease the pressure of fluid flowing from the first chamber to the third chamber;

a second restrictive check valve means opening from said third chamber to said storage space permitting fluid to flow from said third chamber to said storage space, said restrictive check valve means limiting the flow of fluid therethrough to cause pressure in the third chamber and in the first chamber to increase in response to piston movement toward the first chamber.

28. A device according to claim 27 wherein the regulating valve is constructed and disposed so that the forces acting on the regulating valve are R, $F_1$ and $F_2$ and $F_1 = (P_1 - P_4)s$;

$F_2 = (P_1 - P_2)(S - s)$; wherein

R is the force exerted on the regulating valve by the return spring;

$P_1$ is the fluid pressure in the first chamber;

$P_2$ is the fluid pressure in the second chamber;

$P_4$ is the pressure of the gas in the reference chamber;

s is the effective area of the first surface portion of the regulating valve exposed to the gas in the reference chamber; and S is the effective area of said second surface portion of the regulating valve.

* * * * *